United States Patent [19]

Blad

[11] Patent Number: 4,735,672

[45] Date of Patent: Apr. 5, 1988

[54] AUTOMATED FIBER LAY-UP MACHINE

[75] Inventor: Leiv H. Blad, Van Nuys, Calif.

[73] Assignee: Lockheed Corporation, Calabasas, Calif.

[21] Appl. No.: 634,651

[22] Filed: Jul. 25, 1984

Related U.S. Application Data

[63] Continuation of Ser. No. 382,496, May 27, 1982, abandoned.

[51] Int. Cl.$^4$ ............................................. B65H 81/00
[52] U.S. Cl. ..................................... 156/361; 156/433
[58] Field of Search ............... 156/433, 441, 425, 361, 156/363, 353, 169, 166, 172, 173, 175, 540, 522, 526, 180, 181

[56] References Cited

U.S. PATENT DOCUMENTS

| | | | |
|---|---|---|---|
| 3,380,675 | 4/1968 | Baxter et al. | 156/425 |
| 3,574,040 | 5/1971 | Chitwood et al. | 156/522 |
| 3,616,070 | 10/1971 | Lemelson | 156/173 |
| 3,775,219 | 11/1973 | Karlson et al. | 156/363 |
| 3,810,805 | 5/1974 | Goldsworth et al. | 156/425 |
| 3,962,393 | 6/1976 | Blad | 264/90 |
| 4,137,354 | 1/1979 | Mayes et al. | 156/175 |
| 4,419,170 | 12/1983 | Blad | 156/361 |

Primary Examiner—Michael Ball
Attorney, Agent, or Firm—Frederic P. Smith

[57] ABSTRACT

An automated fiber lay-up machine for the fabrication of reticulated structures comprising an upper carriage (12) which carries a fibrous material handling system (14), including a source of resin (78), and a lower carriage (44) which carries a fiber laying head (46). The upper and lower carriages each have a selected number of degrees of freedom of movement to allow positioning of the fibrous material handling system and the fiber laying head. Means (20, 32, 50, 60, 113) are provided to move and control the motion of the upper and lower carriages. The movement of the upper carriage is slaved to the movement of the lower carriage to allow the fibrous material handling system to dispense the fibrous material to the fiber laying head. The fiber laying head can rotate to provide an extra degree of freedom and can also be independently moved normal to a work surface. The resin is applied directly to the fiber laying head concomitant with the fibrous material, while the fiber laying head is adapted to lay the fibrous material flat on the work surface.

5 Claims, 5 Drawing Sheets

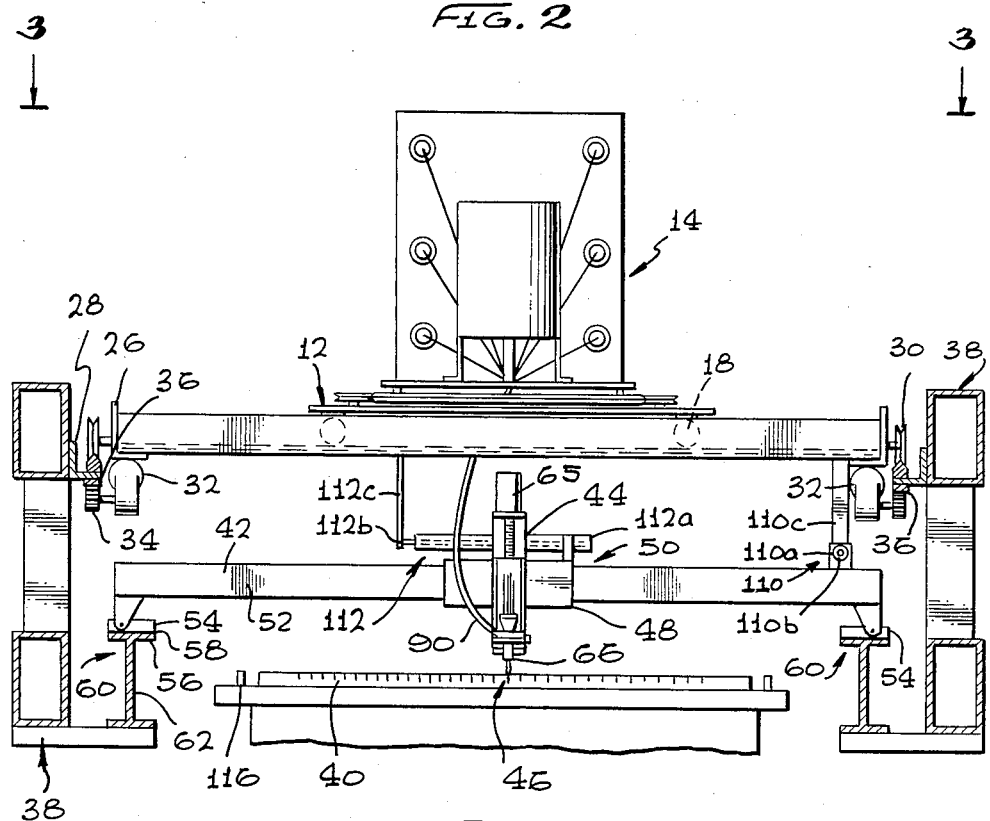

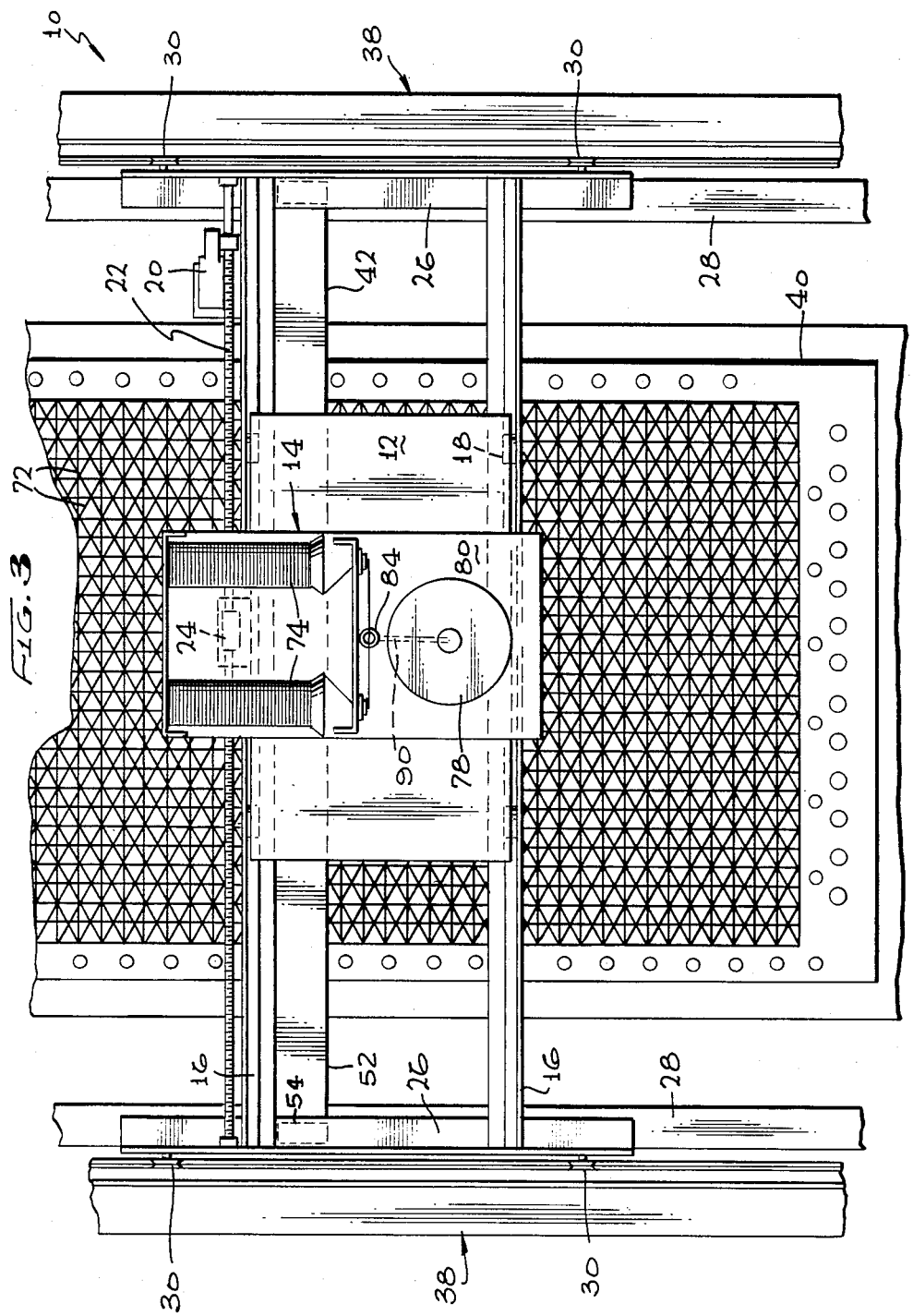

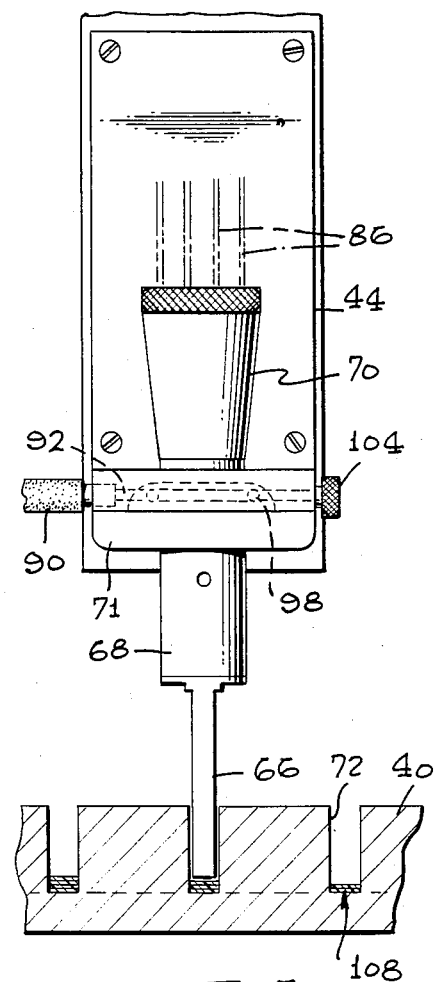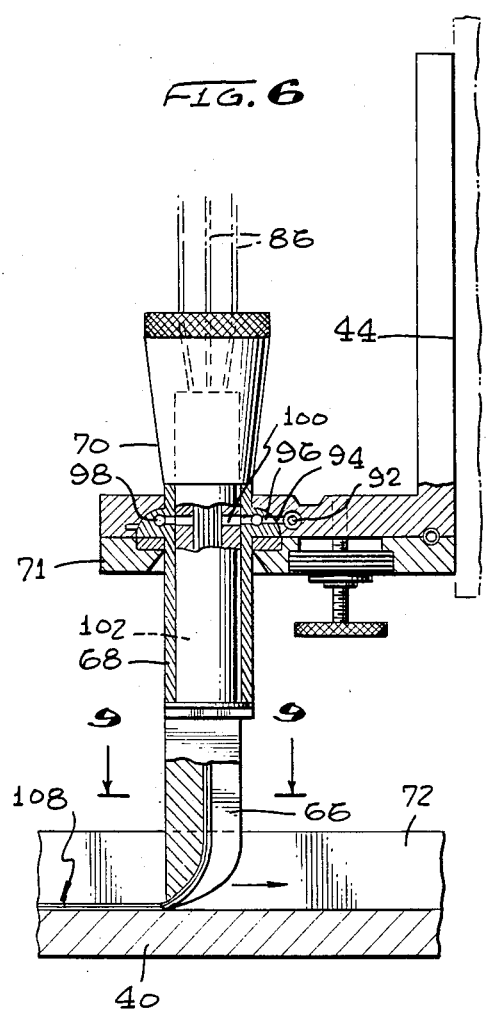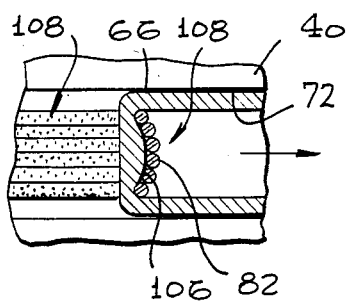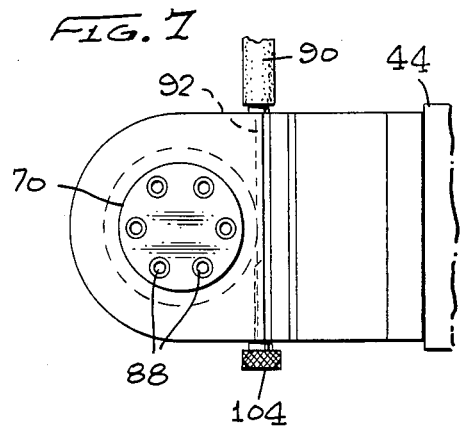

FIG.10
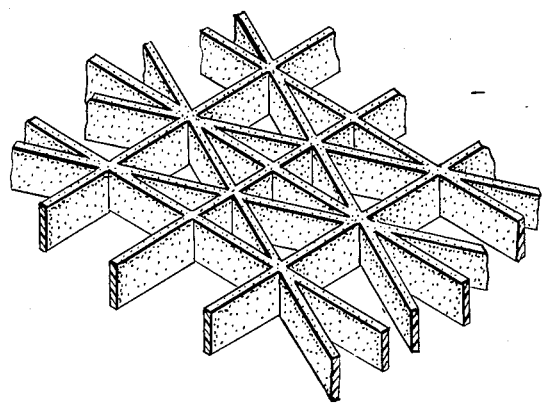
FIG.8A
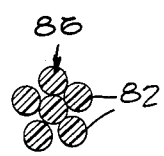
FIG.11
FIG.8B
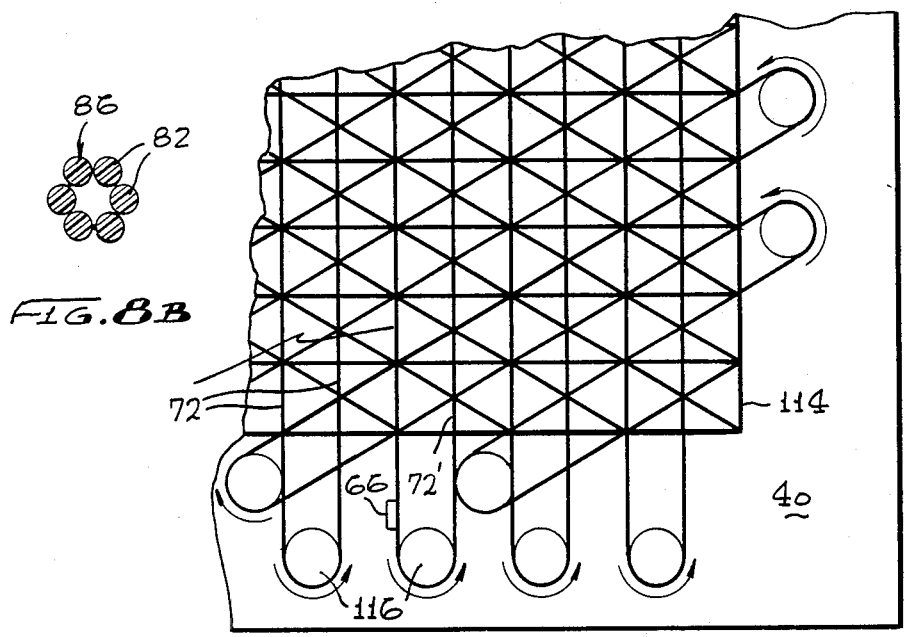

AUTOMATED FIBER LAY-UP MACHINE

This is a continuation of co-pending application Ser. No. 382,496, filed on May 27, 1982, now abandoned.

TECHNICAL FIELD

The invention relates to the field of machines suitable for the fabrication of composite structures and, in particular, to an automated machine suitable for laying up fibrous materials.

BACKGROUND ART

In this era of rapidly rising labor costs and increasing disinterest in factory work, it has become a necessity to move toward automation of manufacturing processes. One of the more recent manufacturing processes utilizes composite materials in the form of dry fibers coated with wet resin to form reticulated structures. One such structure is illustrated in U.S. Pat. No. 3,962,393 entitled "Method for Making A Hollow Laminated Article". This structure is generally formed by laying fibrous material, such as fiberglass, graphite or boron filaments, and organic resin, on a mandrel and then curing it by the application of heat and pressure.

In order to have an efficient automated lay-up process, it is necessary that the head laying the material move quickly and accurately over the surface on which the material is to be laid. Material laying heads typically used in prior art machines are shown in U.S. Pat. No. 3,574,040 to Chitwood et al and U.S. Pat. No. 3,775,219 to Karlson et al. In these machines, the material laying heads carry not only the mechanism for laying the material but also the mechanism for holding the spools of material and dispensing the material to the material laying head. Thus the material laying heads must of necessity be bulky and weighty and are difficult to maneuver with rapidity and accuracy due to their weight and inertia.

Accordingly, it is a general object of the present invention to provide an improved automated fiber lay-up machine for the fabrication of reticulated structures.

It is another object of the present invention to provide an improved automated fiber lay-up machine which can rapidly and accurately lay up fibrous materials.

It is a further object of the present invention to provide an improved automated fiber lay-up machine in which the laying head has a minimum of bulk and weight.

It is still another object of the present invention to provide an improved automated fiber lay-up machine in which the laying head can be rapidly and accurately maneuvered.

DISCLOSURE OF INVENTION

An automated fiber lay-up machine for the fabrication of reticulated structures is provided. The lay-up machine comprises an upper carriage which carries a fibrous material handling system, including a source of resin, and a lower carriage which carries the fiber laying head. The upper and lower carriages each have a selected number of degrees of freedom of movement to allow positioning of the fibrous material handling system and the fiber laying head. Means are provided to move and control the motion of the upper and lower carriages. The movement of the upper carriage is slaved to the movement of the lower carriage to allow the fibrous material handling system to dispense the fibrous material to the fiber laying head. The fiber laying head can rotate to provide an extra degree of freedom and can also be independently moved normal to work surface. The resin is applied directly to the fiber laying head concomitant with the fibrous material, while the fiber laying head is adapted to lay the fibrous material flat on the work surface.

The novel features which are believed to be characteristic of the invention, both as to its organization and its method of operation, together with further objects and advantages thereof, will be better understood from the following description in connection with the accompanying drawings in which a presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 2 is a cross-sectional view of the present invention taken along line 2—2 of FIG. 1.

FIG. 3 is a top plan view of the present invention taken along line 3—3 of FIG. 2.

FIG. 4 is an enlarged cross-sectional view of the present invention taken along line 4—4 of FIG. 1.

FIG. 5 is a plan view of the fiber laying head of the present invention.

FIG. 6 is a cross-sectional view of the fiber laying head of the present invention similar to that of FIG. 5 with the bottom portion rotated ninety degrees.

FIG. 7 is a top plan view of the fiber laying head of FIG. 5.

FIGS. 8A and 8B are cross-sectional views of a fiber bundle used in the present invention.

FIG. 9 is a cross-sectional view of the fiber laying head of FIG. 6 taken along line 9—9 of FIG. 6.

FIG. 10 is a perspective view of a reticulated structure fabricated by the present invention.

FIG. 11 is a plan view of a portion of the lay-up tool shown in FIG. 1.

BEST MODE FOR CARRYING OUT THE INVENTION

Figure 1:
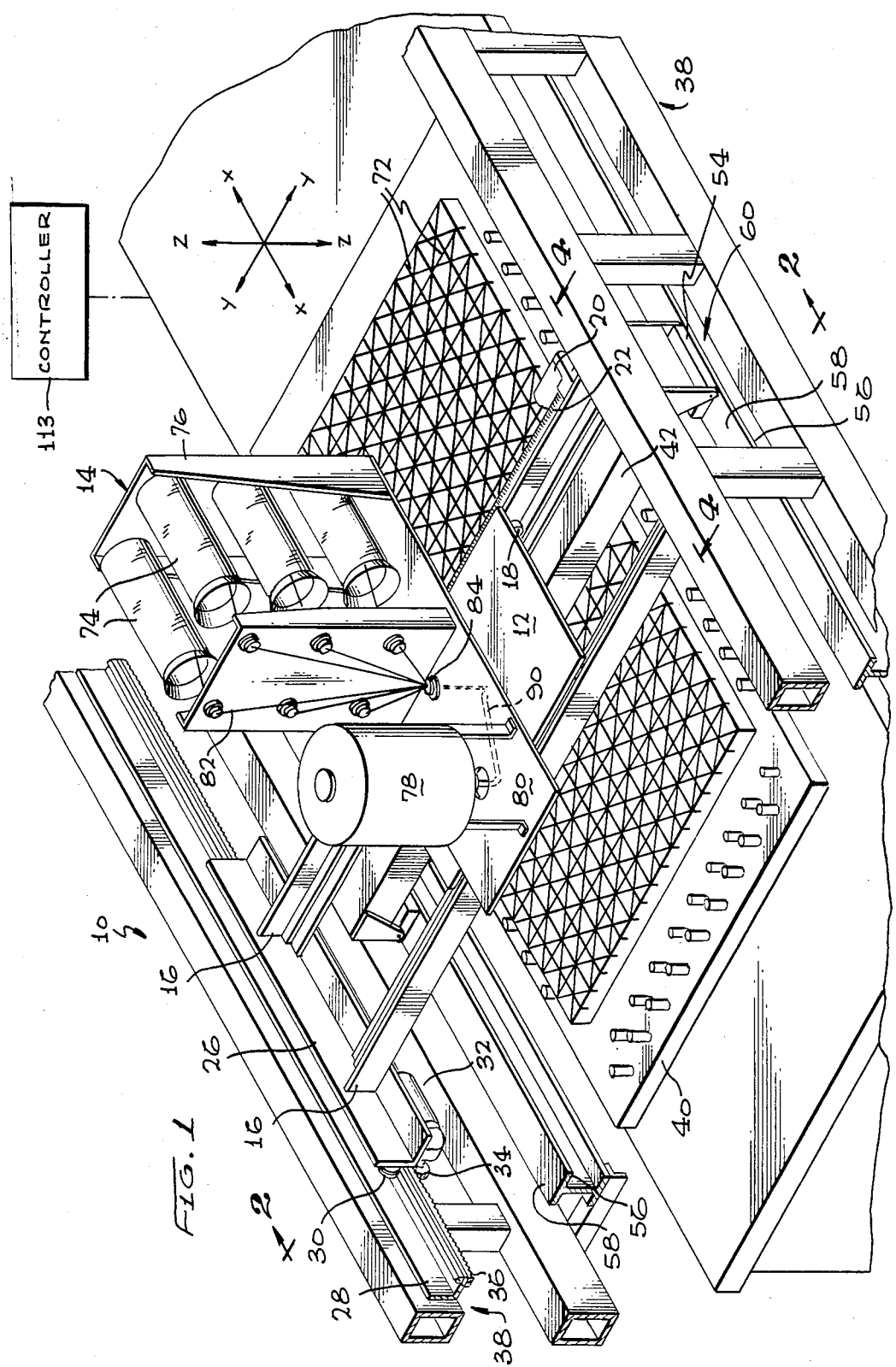
FIG. 1 is a perspective view of the present invention.

Referring now to FIG. 1, a perspective view of an automated fiber lay-up machine 10 of a preferred embodiment of the present invention is illustrated. The lay-up machine 10 has an upper carriage 12 to which is coupled a material handling system 14. The upper carriage 12, as shown also in FIGS. 2 and 3, is mounted on a pair of rails 16 by means of rollers 18 and is driven in the Y-direction along rails 16 by motor 20 which rotates worm screw drive shaft 22 through worm screw drive nut 24 coupled to the upper carriage 12. Rails 16 are mounted on beams 26 which ride on beams 28 by means of rollers 30. Attached to the underside of beams 26 are motors 32 which drive gears 34 which engage the toothed undersurface 36 of beams 28 and thus propel upper carriage 12 in the X-direction. Beams 28 are coupled to a support structure 38 which carries beams 28 and upper carriage 12 a selected distance above the workbed or lay-up tool 40.

The lay-up machine 10 additionally has a beam 42 to which is coupled, as shown in FIG. 4, a lower carriage 44 for the fiber laying head 46, shown in FIG. 5, to enable the fiber laying head 46 to be driven in the X and Y directions. The lower carriage 44 is coupled to the beam 42 through support 47 attached to winding 48, supported by roller bearing 49, which forms the moving coil (rotor) of a linear induction motor 50, the beam 42 having a surface pattern 52 of conductive and non-conductive regions which forms the stator of the linear induction motor 50. Such a linear induction motor 50 is marketed by the Xynetics Company of Santa Clara, Calif. and the principles of operation thereof are described in U.S. Pat. No. Re. 27,436 to Sawyer. The linear induction motor 50 causes the lower carriage 44 to be moved rapidly and precisely in the Y direction. The beam 42 is coupled to windings 54 which are supported on air bearings by beams 56 which have a surface pattern 58 thereon of conductive and non-conductive regions. As above, the windings 54 and the beams 56 with the surface pattern 58 form the rotors and stators of linear induction motors 60 which cause the beam 42 and the lower carriage 44 to be moved rapidly and precisely in the X direction. The beams 56 are coupled to support structures 62 which carry the beams 56 and thus the lower carriage 44 a selected distance above the lay-up tool 40. The fiber laying head 46 is also adapted to be driven in the Z direction and is capable of rotary motion around the Z axis. Referring to FIG. 4, the fiber laying head 46 is coupled by the lower carriage 44 to worm screw drive shaft 62 supported by bracket 63 and worm screw drive nut 64, the drive shaft 62 being driven by motor 65 to drive fiber laying head 46 in the Z direction.

As is shown in FIGS. 5-7, the fiber laying head 46 is supported by lower carriage 44 a selected distance above the lay-up tool 40. The fiber laying head 46 consists of a fiber laying nozzle 66 which slides inside of bearing member 68 and is threaded at its top portion to couple with cap 70. The bearing member 68 is held between the lower carriage 44 and plate 71 and has a limited degree of tilting motion to allow for variations in the slots 72 on the lay-up tool 40. The fiber laying nozzle 66 and the cap 70 can rotate within bearing member 68 to allow the fiber laying head 46 to be capable of rotary motion around the Z axis as far as the laying of the fibrous material is concerned.

As is illustrated in FIG. 1, the material handling system 14 consists of a series of fiber spools 74 mounted in a fixture 76 and a resin pot 78, the fixture 76 and the resin pot 78 being carried by plate 80 coupled to upper carriage, plate 80 and carriage 12 thus serving to support the fixtures 76 and the resin pot 78. The fibers 82 are guided through aperture 84 to the cap 70 shown in FIG. 5. As shown in FIGS. 7, 8A and 8B, the fiber bundle 86 is separated by the apertures 88 in cap 70 into a regular (shown as hexagonal) pattern of fibers 82. The resin in the resin pot 78 is forced under pressure down tube 90 into a channel 92 in the lower carriage 44. The channel 92 communicates through aperature 94 with an aperture 96 in the bearing member 68. The bearing member 68 has a circular channel 98 on its inside surface coupled to the aperture 96. The fiber laying nozzle 66 has a plurality of apertures 100 which are contiguous to the channel 98 and allow resin to flow from the channel 92 through apertures 94, 96 into channel 98 and then into the hollow interior 102 of the fiber laying nozzle 66 to impregnate the fiber bundle 86. The resin flow is controlled by needle valve 104 which controls the effective size of the aperture 94. As shown in FIG. 9, the fiber laying nozzle 66 has a convex surface 106 over which the now resin impregnated fiber bundle 86 is passed to separate the fiber bundle 86 into a linear array 108 of fibers 82 which are then laid flat on the surface of the lay-up tool 40.

In operation, power is supplied to motors 20, 32, 50 and 60 to move upper carriage 12 and lower carriage 44, and thus the material handling system 14 and the fiber laying head 46, to the position where the fiber bundle 86 is to be laid on the lay-up tool 40. Transducers 110 and 112 are provided to control the application of power to motors 32 and 20, respectively, so that the upper carriage 12 is slaved to the movement of the lower carriage 44. Transducer 110 consists of a cylinder 110a affixed to the beam 42 and a rod 110b inserted in the cylinder 110a and affixed by member 110c to the beam 26 supporting the upper carriage 12. Any motion of the lower carriage 44 in the X direction not accompanied by a like motion of the upper carriage 12 will cause a relative motion of the cylinder 110a and the rod 110b which will generate an output signal and cause motor 32 to be actuated. Similarly, transducer 112 consists of a cylinder 112a affixed to winding 48 of motor 50 and a rod 112b inserted in the cylinder 112a and spring loaded against member 112c affixed to the upper carriage 12. Any motion of the lower carriage 44 in the Y direction not accompanied by a like motion of the upper carriage 12 will cause a relative motion of the cylinder 112a and the rod 112b which will generate an output signal and cause motor 20 to be actuated.

Once the fiber laying head 46 is in position, it is then lowered to the surface of the lay-up tool 40 by activation of motor 65. The fiber laying head 46 is generally lowered in a direction substantially normal to a horizontal plane which is tangent to the surface of the lay-up tool 40 at the point of contact of the fiber laying nozzle 66 with the lay-up tool 40. Power is then selectively applied by a controller 113 to the above-cited motors so that the fiber bundle 86 can be laid in a selected pattern on the surface of the lay-up tool 40. The height of fiber laying head 46 in the Z direction is controlled to allow multiple layers of the fiber bundle 86 to be laid down when the fiber bundle 86 is laid down and also is crossed over itself in multiple passes to make reticulated structures, as illustrated in FIG. 10. The reticulated structure shown in FIG. 10 is made by positioning the fiber laying head 46 at a selected position on the lay-up tool 40 near the edge of the die 114, which has a matrix of slots 72 in it, and causing the fiber laying nozzle 66 to enter the slots 72 while laying the fiber bundle 86. At the end of a slot 72, as shown in FIG. 11, the nozzle 66 exits the slot 72 and is moved toward post 116. As the direction of the fiber laying head 46 carried by lower carriage 44 is changed by selective actuation of motors 50 and 60 to go around the post 116, the side of the nozzle 66 comes into contact with the periphery of the post 116 which causes it to swivel around the Z axis and thus change direction to head back into slot 72'. By suitably positioning the posts 116 around the periphery of the die 114, the fiber bundle 86 can be laid in all the slots 72 a selected number of layers deep to produce the reticulated structure shown in FIG. 10. If it is desired, the motion around the Z axis of the fiber laying head 46 can be mechanized as shown in my copending application, Ser. No. 382,497, filed May 27, 1982, now U.S. Pat. No. 4,419,170, and the posts 116 can be eliminated. In addition, the upper carriage 12 can be eliminated for short passes since the fibers 82 and the tube 90 can be made long enough to reach and travel with the moving fiber laying head 46.

An automated fiber lay-up machine has thus been described in which the heavy and bulky fibrous material handling system has been disengaged from the fiber laying head. The fiber laying head which has a minimum of bulk and weight is carried by a rapid and accurate positioning and driving system and is fed fibrous material by the fibrous material handling system which is carried by a separate driving system slaved to the motion of the fiber laying head. With this description in mind, it is obvious that numerous modifications and departures may be made by those skilled in the art; thus, the invention is to be construed as being limited only by the spirit and scope of the appended claims.

INDUSTRIAL APPLICABILITY

The automated fiber lay-up machine is useful in the manufacture of reticulated composite structures.

I claim:

1. A fiber lay-up machine for laying up fibrous material in a selected pattern on the surface of a lay-up tool comprising:

supply means for supplying said fibrous material, said supply means including a source of resin;

support means for supporting said supply means and having at least two degrees of freedom of movement;

fiber laying means coupled to said supply means and adapted to receive said fibrous material and said resin to lay down resin impregnated fibrous material on said surface of said lay-up tool;

carriage means adapted to carry only said fiber laying means and having at least two degrees of freedom of transverse movement to control the position of said fiber laying means across the surface of said lay-up tool, said carriage means being capable of movement independent of said support means and having at least said two degrees of freedom of transverse movement to enable said fiber laying means to move across the surface of said lay-up tool in at least two transverse dimensions to lay up said selected pattern on the surface of said lay-up tool; and means for moving said carriage means.

2. A fiber lay-up machine for laying up fibrous material in a selected pattern on the surface of a lay-up tool comprising:

supply means for supplying said fibrous material, said supply means including a source of resin;

support means for supporting said supply means;

fiber laying means coupled to said supply means and adapted to receive said fibrous material and said resin to lay down resin impregnated fibrous material on said surface of said lay-up tool;

carriage means adapted to carry only said fiber laying means and having at least two degrees of freedom of transverse movement parallel to the plane of the surface of said lay-up tool to control the position of said fiber laying means across the surface of said lay-up tool, said carriage means having said two degrees of freedom of transverse movement being capable of movement independent of said support means and said carriage means having at least said two degrees of freedom of transverse movement to enable said fiber laying means to move parallel to the plane of and across the surface of said lay-up tool in at least two transverse dimensions and to lay up said selected pattern in the plane of the surface of said lay-up tool; and means for moving said carriage means independent of said support means, said support means comprising:

second carriage means adapted to carry said supply means and having a selected number of degrees of freedom of movement to allow positioning of said supply means, said second carriage means being capable of movement independent of said carriage means; and means for moving said second carriage means.

3. The fiber lay-up machine of claim 2 further comprising means for slaving the motion of said second carriage means to the motion of said carriage means.

4. The fiber lay-up machine of claim 3 wherein said slaving means includes transducer means coupled to said carriage means and said second carriage means for sensing the relative motion thereof and for generating an output signal in response to said relative motion to control said means for moving said second carriage means.

5. A fiber lay-up machine for laying up fibrous material in a selected pattern on the surface of a lay-up tool comprising:

supply means for supplying said fibrous material, said supply means including a source of resin;

support means for supporting said supply means;

fiber laying means coupled to said supply means and adapted to receive said fibrous material and said resin to lay down resin impregnated fibrous material on said surface of said lay-up tool, said fiber laying means including a fiber laying nozzle, said fiber laying nozzle being adapted to follow the contours of a lay-up tool and to lay said fibrous material down flat on said lay-up tool, said fiber laying nozzle having a convex inner surface over which said fibrous material is drawn prior to being laid down on said lay-up tool, said convexity extending substantially parallel to the plane of motion of said fibrous material;

carriage means adapted to carry only said fiber laying means and having at least two degrees of freedom of transverse movement parallel to the plane of the surface of said lay-up tool to control the position of said fiber laying means across the surface of said lay-up tool, said carriage means having said two degrees of freedom of transverse movement being capable of movement independent of said support means and said carriage means having at least said two degrees of freedom of transverse movement to enable said fiber laying means to move parallel to the plane of and across the surface of said lay-up tool in at least two transverse dimensions and to lay up said selected pattern in the plane of the surface of said lay-up tool; and means for moving said carriage means.

* * * * *